No. 11.712. Reissued Jan. 24, 1899.
A. NAVAREIN.
CLOISONNÉ WORK.
(Application filed June 22, 1898.)
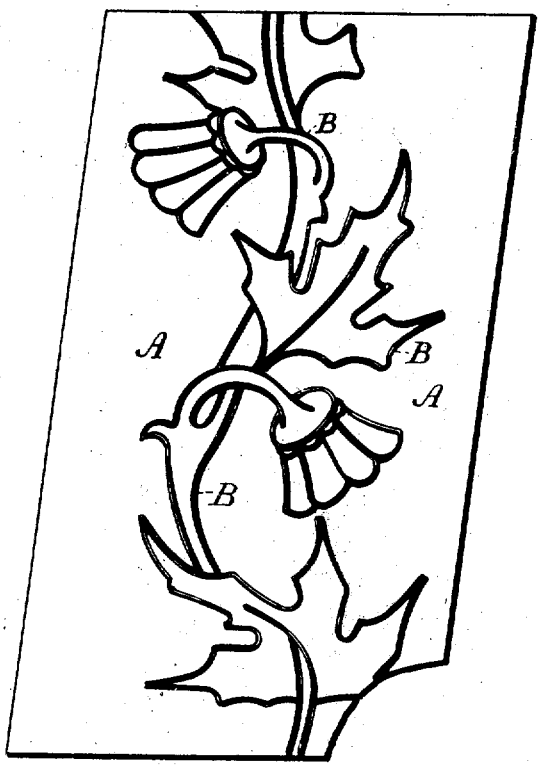
Witnesses:
J. Stair
Chas. H. Smith
Inventor:
Amedée Navarein
by L. W. Serrell & Son Attys

UNITED STATES PATENT OFFICE.

AMEDÉE NAVAREIN, OF PARIS, FRANCE, ASSIGNOR TO THEOPHIL PFISTER AND EMIL BARTHELS, OF LONDON, ENGLAND.

CLOISONNÉ-WORK.

SPECIFICATION forming part of Reissued Letters Patent No. 11,712, dated January 24, 1899.

Original No. 587,225, dated July 27, 1897. Application for reissue filed June 22, 1898. Serial No. 684,196.

*To all whom it may concern:*

Be it known that I, AMEDÉE NAVAREIN, artist, a citizen of the Republic of France, residing at No. 28 Rue de Theatre, Paris, in the Republic of France, have invented a certain new and useful Improvement in Cloisonné-Work, of which the following is a specification, reference being had to the accompanying drawing.

This invention relates to cloisonné-work that is made with reference to being transparent, so as to adapt the same to windows and panels. Before my invention metal strips had been bent to shape according to a pattern and the spaces filled in with a cement, different colors and materials being made use of. In the present instance the metallic strips are affixed to the surface of a glass and the intermediate spaces are filled in with transparent or translucent materials, so as to be adapted to windows, panels, &c.

In practicing my invention the design which it is desired to impart to the work is first drawn on a piece of paper. A clear or transparent plate of glass A is then laid upon the paper, through which may be viewed the outline design. Narrow strips B of suitable metal, such as polished brass, are then bent to conform to or register with the outlines of the design drawn upon the paper, and they are arranged on the glass plate over the said outlines. Said strips are then cemented to the glass plate by adhesive material, such as gum-arabic. After the adhesive material has become sufficiently hardened the spaces between the outlines are filled with broken glass or similar materials of the required degree of fineness and of the proper colors to form the ornamental design. These particles of broken glass or similar materials are in a thin layer, and they are to be cemented or bound together by adhesive material, preferably diluted fish-glue or isinglass mixed with a small quantity of bichromate of potash to prevent the absorption of moisture from the atmosphere by the glue and to facilitate subsequent drying. This adhesive material is preferably applied in a sufficiently-heated condition. Only a small quantity of bichromate is used, so that the glue may not be colored. The glue is spread over the broken glass or similar material in any suitable manner, just sufficient glue being used to cause the particles to adhere together and to the glass. The plate thus prepared is then dried at a suitable temperature of about 30° centigrade, and it will be found that the transparent plate of glass or transparent panel having a highly-decorative appearance is produced at little expense and with expedition. A second plate of glass may be applied above the metallic strips, and the edges of the two plates of glass can be sealed together by suitable cement to exclude the atmosphere.

The polished-brass strips give great brilliancy to the outline of the design, and the transparent colored-glass filling combined with the polished brass gives a most elaborate and highly-decorative effect to the window or transparent panel.

Having now described my invention, what I claim is—

1. As a new article of manufacture, the herein-described decorative article, consisting of a transparent base, a plurality of strips bent to form the outlines of the design and attached to the said base by adhesive material, granular filling material disposed in a thin layer between the strips and bound together by adhesive material, substantially as set forth.

2. As a new article of manufacture, the herein-described decorative article, consisting of a transparent base, a plurality of metallic strips bent to form the outlines of the design and attached to the said base by adhesive material, granular filling material disposed in a thin layer between the metallic strips and bound together by adhesive material, and a transparent plate over the design cemented around the edges to the base, substantially as specified.

AMEDÉE NAVAREIN.

Witnesses:

MAURICE COLLET,

EDWARD P. MACLEAN.